Jan. 4, 1927.

S. H. NOYES 1,613,189

TROLLEY WHEEL

Filed Dec. 11, 1925

Inventor.
Sewell H. Noyes
by Heard Smith Hunnant
Attys.

Patented Jan. 4, 1927.

1,613,189

UNITED STATES PATENT OFFICE.

SEWELL H. NOYES, OF NEWBURYPORT, MASSACHUSETTS.

TROLLEY WHEEL.

Application filed Decmeber 11, 1925. Serial No. 74,717.

This invention relates to trolley wheels and has for one of its objects to provide a novel trolley wheel that has capability of longer life than the ordinary trolley wheel and for another object to provide an improved trolley wheel which is so mounted that it will readily follow the wire in travelling around the curve.

The trolley wheel which is most commonly used on electric cars is a cast brass wheel having a wire-receiving groove for the trolley wire. In use the greatest wear comes on the bottom of the groove and after a comparatively short term of use the groove in the cast brass trolley wheel will become worn so deep as to render the trolley wheel unfit for use.

I propose to gain the longer life in the trolley wheel by so making the wheel that the bottom of the groove will be formed of harder material than is found in a cast brass wheel and a trolley wheel is thus provided in which the portion thereof that receives the greatest wear is made of material which is better fitted to withstand the wear than is the case with trolley wheels as now commonly made.

In order to give an understanding of the invention I have illustrated in the drawings a selected embodiment thereof which will now be described after which the novel features will be pointed out in the appended claims.

Figure 1:
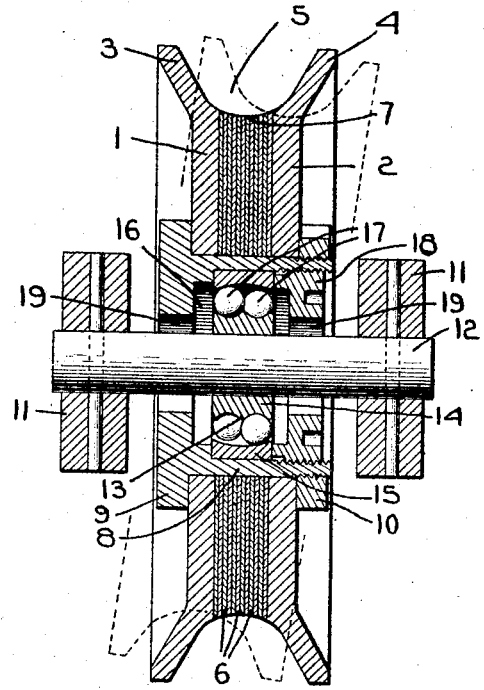
Fig. 1 is a sectional view of a trolley wheel embodying my invention.
Figure 2:
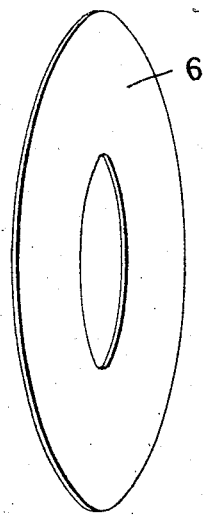
Fig. 2 is a perspective view of the rolled metal disks which are used in forming the center portion of the wheel.

My improved trolley wheel is formed with two side members which may be of cast brass or any other suitable material and the peripheral portions of which form the sides of the trolley-wire-receiving groove, and a central portion made of a material harder than cast brass but having good conductive properties.

One material suitable for use in making the central portion is rolled brass and I propose to form the central portion of the trolley wheel with a plurality of disks of rolled brass, said disks being confined between the two side pieces.

The side members are indicated at 1 and 2 respectively and the peripheral portions 3 and 4 thereof form the sides of the peripheral grooves 5 of the trolley wheel.

Situated between the two side members 1 and 2 are a plurality of disks 6 of rolled brass or similar material which is harder than the cast brass. The peripheral portion of these disks forms the bottom 7 of the groove in which the trolley wire is received and the trolley wheel, therefore, has a groove in which the bottom thereof that receives the most wear is made of harder material than the sides that receive relatively little wear.

The sides 1 and 2 and the center portion composed of the disks 6 may be connected together in any suitable way to make a unitary structure. In the embodiment of the invention herein shown I provide a hub member 8 on which the side members 1 and 2 and the disks 6 are mounted. This hub member has a flange 9 at one end against which one of the side members is received and at its other end it has a ring nut 10 screwed thereon which engages the other side member and which clamps the side members and the rings together.

The trolley wheel may be mounted in the trolley harp 11 in any usual way. I prefer, however, to employ a mounting which will allow the trolley wheel to tilt more or less so as to permit it to readily follow around a curve without jumping off the trolley wire. This saves wear on both the trolley wheel and trolley wire. As herein shown the trolley wheel is mounted on a spindle 12 which is carried in the trolley harp 11 and a universal ball bearing 13 is interposed between the spindle 12 and the hub 8, the latter being hollow to receive the bearing. This bearing is one which not only permits the trolley wheel to freely rotate but also allows it to have a tilting or tipping motion as shown by the dotted lines Fig. 1.

The bearing, which is indicated generally at 13, comprises the inner member 14 which is fast on the spindle 12, the outer ring member 15 which is situated within the chamber 16 of the hub 8 and the balls 17 between the two members 15 and 16. This bearing is retained in the chamber 16 by means of a collar or nut 18 which is screw-threaded into the end of the hub 8. The end of the hub 8 and the nut 18 have enlarged openings 19 therethrough to receive the spindle 12, the openings being large enough to permit swinging motion of the trolley wheel.

I claim:

1. A trolley wheel comprising two side members, the peripheral portions of which form the sides or flanges of the wire-receiving groove, and a center portion comprising a plurality of disks which are confined between the side members and the peripheries of which form the bottom of the groove.

2. A trolley wheel comprising two side members, the peripheral portions of which form the sides or flanges of the wire-receiving groove, and a center portion comprising a plurality of disks which are confined between the side members and the peripheries of which form the bottom of the groove, said disks being made of harder material than the side members.

3. A trolley wheel comprising a hub member, two side members mounted thereon and a plurality of disks situated between the side members, the periphery of said disks forming the bottom of the trolley-wire-receiving groove of said trolley wheel.

4. In a trolley wheel, the combination with a hub member having a flange at one end, two side members mounted on the hub member, the peripheries of which form the sides or flanges of the trolley wire-receiving groove, a plurality of disks mounted on the hub member between the side members, the peripheries of said disks forming the bottom of said groove, a nut screwed onto the end of the hub and clamping the side members and disks together.

In testimony whereof, I have signed my name to this specification.

SEWELL H. NOYES.